Jan. 20, 1925.
H. BELOIT
1,523,575
STANDING VALVE STRUCTURE
Filed Feb. 2, 1924
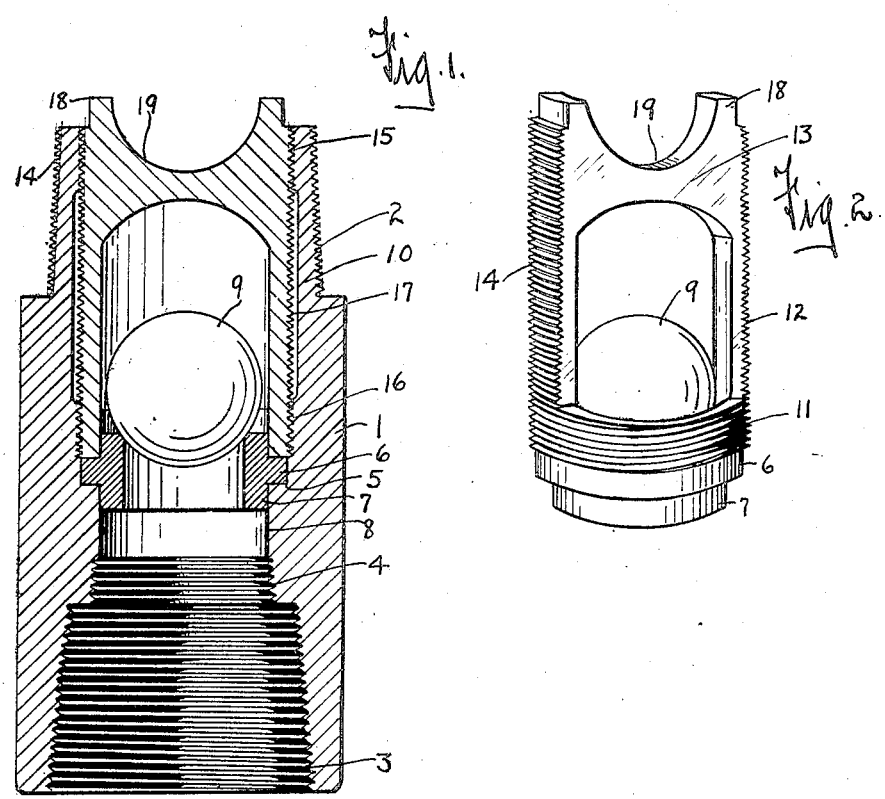
HARRY BELOIT, Inventor
By Jesse R. Stone
his Attorney Patented Jan. 20, 1925.

1,523,575

UNITED STATES PATENT OFFICE.

HARRY BELOIT, OF HOUSTON, TEXAS, ASSIGNOR TO PETROLEUM SUPPLY COMPANY, OF HOUSTON, TEXAS, A CORPORATION OF DELAWARE.

STANDING-VALVE STRUCTURE.

Application filed February 2, 1924. Serial No. 690,147.

*To all whom it may concern:*

Be it known that I, HARRY BELOIT, a citizen of the United States, residing at Houston, Harris County, Texas, have invented a certain new and useful Improvement in Standing-Valve Structures, of which the following is a specification.

My invention relates to standing valves used on working barrels in reciprocating pumps. It is particularly adapted for use is deep well pumping for oil or water.

In the ordinary type of deep well pump, the volume of liquid which the pump will handle is limited by the size of the passage past the standing valve at the lower end of the pump barrel. The valve itself so fills the passage that only a limited amount of fluid can pass. I desire to increase the capacity of such pumps by so constructing the valve and valve chamber that the passage of liquid therethrough will be unimpeded thus allowing a free flow for such liquid as may pass through the valve seat.

It is a further object to so construct the valve that it will have a minimum number of parts and thus be simple and strong and economical to manufacture.

Referring to the drawing, wherein a preferred embodiment of my invention is shown, Fig. 1 is a central longitudinal section through a standing valve employing my invention. Fig. 2 is a perspective view of the interior structure removed. Like numerals of reference are employed to designate like parts in all the views.

In the drawing I have shown my valve structure as fitting within a special coupling or shoe 1, which comprises a collar of the same general diameter as the tubing and having a reduced upper end 2 threaded for attachment within a shoe of ordinary construction which may be employed upon the lower end of the working barrel. Most of these couplings now in common use have a uniformly threaded lower end into which a threaded shank 2 may engage.

The lower end of this coupling is threaded at 3 for attachment to a perforated pipe or strainer, and above this threaded connection the entire diameter is decreased at 4 and threaded to receive a smaller pipe such as a gas anchor if desired.

Above the threaded opening 4 there is provided a shoulder or seat 5 to receive an outer flange 6 upon a reversible valve seat 7 of ordinary construction. The lower end of the valve seat fits within the throat 8 of the shoe. The passage through the seat is closed by means of a ball valve 9 opening upwardly in the usual manner.

The valve is retained within its seat by means of a frame 10, the general construction of which is illustrated best in Fig. 2. It comprises a lower threaded ring 11 having two opposite legs 12 extending upwardly for a predetermined distance and connecting with a cross bar 13. The legs and the upper bar 3 are threaded at 14 on their outer faces to engage with the inner portion of the shoe. It will be noted on reference to Fig. 1 that the inner face of the shoe is threaded for a short distance at 15 at its upper end, and at another portion 16 adjacent the lower end, and the intervening area between these threaded portions is recessed or counterbored slightly at 17 to increase the entire diameter of the valve chamber thus formed.

The upper end of the valve frame 10 is formed with upwardly extending lugs 18 between which the cross-bar 13 is cut away at 19 to allow the free passage of liquid when the device is employed with certain other types of working barrel couplings. It is to be understood that when the upper end of the shoe 1 is engaged within couplings employed with certain makes of pumps, the upper shoulders on the lugs 18 will contact with a lower shoulder formed in a coupling and the cut away portion 19 will allow the free passage of liquid without choking the channel through the coupling above.

The opening between the posts or legs 12 in the valve frame is wide enough to allow the free insertion of the ball valve 9 into its seat and the lower interior diameter of the ring 11 of the frame is so formed that there is a driving fit between the ring and the valve seat 6. Thus when the device is assembled the valve seat may be driven into the lower end of the frame and will remain in such position until again driven out by a blow from a hammer or other similar tool. The ball may then be inserted from the side and into the position shown in Fig. 2, after which the frame and valve may be screwed into the shoe 1 until the valve seat 6 is brought into close contact with the shoulder 5 upon the nipple. Recessing the interior of the shoe above the valve allows a large space at each side of the upright posts or legs 12 for the passage of fluid, and it is determined by calculation that when thus formed the area outside of the ball and between the same and the inner wall of the chamber 17 will be the same as that of the opening through the passage 7 in the valve seat. A full volume of fluid may thus find a passage upwardly at this portion of the pump without hindrance of the valve. It will be noted in this construction that the valve seat is held securely in position, but will be releasable in the manner described.

The advantages of this construction lie largely in its provision for a free passage of fluid, and also in its simple and strong construction. It provides for a minimum number of parts easily secured in position and again removed, and wherein there is no danger of breakage or deterioration in use.

Other objects and advantages will be apparent to one skilled in the art without further description.

What I claim as new, and desire to protect by Letters Patent is:

1. A standing valve for well pumps comprising a shoe adapted for connection with a pump barrel, an inwardly projecting shoulder thereon, a valve seat shaped to fit said shoulder, a valve frame above said seat comprising a lower threaded ring, upright legs thereon, and a connecting bar at their upper ends, said ring and legs being threaded exteriorly, the interior of said shoe being also threaded above said seat and also adjacent the upper end to receive said valve frame, the intervening portion of said shoe between said threaded portion being counterbored for the purpose described.

2. A standing valve comprising a shoe, a valve seat intermediate its ends, the interior face of said shoe being counterbored to provide a chamber, the inner wall being threaded above and below said chamber, a valve frame having a lower ring to fit against said seat, upright legs on said ring, and means to connect the upper ends of said legs, said ring and legs being threaded for the purpose described.

3. A standing valve comprising a shoe, an inner shoulder, a valve seat thereon, a valve on said seat, a ring fitting on said seat, upright legs on said ring, said shoe being internally threaded above said seat to receive said ring and legs, the inner wall being counterbored above said seat to provide an enlarged valve chamber and means on said legs to limit the upward movement of said valve.

4. A standing valve comprising a valve shoe, a valve seat intermediate the ends thereof, a valve in said seat, the inner wall of said shoe being threaded for a short space above said seat and at the upper end, a counterbored valve chamber between said threaded portions, and a valve frame comprising a threaded ring, upright legs thereon and means on said legs to limit the upward movement of said valve.

5. A standing valve comprising a shoe, a valve seat therein, a valve in said seat, a counterbored chamber above said seat, said shoe being internally threaded above said seat, a threaded ring above said seat, upwardly extending threaded legs on said ring and a bar connecting the upper ends of said legs.

6. A standing valve comprising a shoe, a valve seat, a valve therein, a threaded ring above said seat, a single diametrical bar above said valve, said bar being connected with said shoe at each end to limit the movement of said valve, and means on the opposite ends of said bar connecting said bar and said ring.

7. In a standing valve for pumps the combination of a shoe forming a housing, a valve seat therein, a ball valve in said seat, a ring screwed into said housing above said seat, two opposite upwardly extending legs on said ring connected below their upper ends, said legs being threaded to engage within said housing, the upper ends of said legs being adapted to extend above said housing to form a wrench hold in the manner described.

8. In a standing valve for pumps, a shoe, a valve therein, a ring above said valve, upwardly extending legs on said ring extending above said shoe, and a connecting bar between said legs above said valve curved downwardly on the upper side, said ring and legs being threaded to engage within said shoe.

In testimony whereof I hereunto affix my signature this 21st day of January, A. D 1924.

HARRY BELOIT.